(12) United States Patent
Wu

(10) Patent No.: US 7,497,016 B1
(45) Date of Patent: Mar. 3, 2009

(54) GARDENING SHEARS HAVING RETRACTABLE HANDLES

(76) Inventor: Chin-Sung Wu, 30, Min Yu St., Lu Kang Chen, Changhua Hsien (TW)

(*) Notice: Subject to any disclaimer, the term of this patent is extended or adjusted under 35 U.S.C. 154(b) by 226 days.

(21) Appl. No.: 11/451,014

(22) Filed: Jun. 12, 2006

(51) Int. Cl.
*B26B 13/16* (2006.01)

(52) U.S. Cl. .............................. 30/254; 30/261; 16/429

(58) Field of Classification Search ........... 30/244–271; 15/144.3, 144.4; 16/429
See application file for complete search history.

(56) References Cited

U.S. PATENT DOCUMENTS

| | | | | |
|---|---|---|---|---|
| 3,317,997 A * | 5/1967 | Hedstrom et al. | .............. | 30/248 |
| 3,366,406 A * | 1/1968 | Morris | ........................ | 403/107 |
| 4,964,216 A * | 10/1990 | Gosselin | ....................... | 30/254 |
| 5,058,277 A * | 10/1991 | Kishimoto | .................... | 30/252 |
| 5,787,589 A * | 8/1998 | Auderset | ..................... | 30/261 |
| 6,108,845 A * | 8/2000 | Hung et al. | ..................... | 7/128 |
| 6,223,628 B1 * | 5/2001 | Barron | ........................ | 81/53.11 |
| 6,270,134 B1 * | 8/2001 | Lin | .............................. | 294/16 |
| 6,842,983 B1 * | 1/2005 | Hsu | ........................... | 30/231 |
| 6,883,208 B1 * | 4/2005 | Huang | .......................... | 16/429 |
| 2007/0079512 A1 * | 4/2007 | Nelson et al. | .............. | 30/123.3 |

* cited by examiner

*Primary Examiner*—Hwei-Siu C Payer
(74) *Attorney, Agent, or Firm*—Alan Kamrath; Kamrath & Associates PA

(57) ABSTRACT

A pair of gardening shears include a main body, two shanks, two positioning blocks, two handles, and two handle jackets. Thus, each of the two handles is retracted inwardly onto and fully expanded outwardly from the main body to adjust the distance between the main body and each of the two handles, thereby facilitating the user operating the gardening shears in an energy-saving manner. In addition, each of the two handles is substantially arc-shaped and is bent outwardly to provide a comfortable sensation to the user, thereby facilitating the user holding the gardening shears. Further, each of the two handles is exactly locked onto the main body by the locking member without incurring slip, thereby facilitating the user holding and operating the gardening shears.

14 Claims, 7 Drawing Sheets

GARDENING SHEARS HAVING RETRACTABLE HANDLES

BACKGROUND OF THE INVENTION

1. Field of the Invention

The present invention relates to a gardening tool and, more particularly, to a pair of gardening or pruning shears.

2. Description of the Related Art

A conventional gardening tool, such as a pair of gardening or pruning shears, comprises a main body, and two handles each movably mounted on the main body to adjust the distance between the main body and each of the two handles, thereby facilitating the user operating the gardening shears in an energy-saving manner. However, each of the two handles is mounted on the main body in a straight manner, so that the two handles do not satisfy the ergonomic design, thereby easily causing an uncomfortable sensation to the user when holding the two handles.

BRIEF SUMMARY OF THE INVENTION

In accordance with the present invention, there is provided a pair of gardening shears, comprising a main body having two connecting legs pivotally connected with each other, two shanks each having a first end mounted on the respective connecting leg of the main body, two positioning blocks each mounted on a second end of the respective shank, two handles each movably mounted on the respective shank and each having an end portion movable between the respective connecting leg of the main body and the respective positioning block, and two handle jackets each mounted on the respective handle to move therewith.

The primary objective of the present invention is to provide a pair of gardening shears having retractable handles.

Another objective of the present invention is to provide a pair of gardening shears, wherein each of the two handles is retracted inwardly onto and fully expanded outwardly from the main body to adjust the distance between the main body and each of the two handles, thereby facilitating the user operating the gardening shears in an energy-saving manner.

A further objective of the present invention is to provide a pair of gardening shears, wherein each of the two handles is substantially arc-shaped and is bent outwardly to provide a comfortable sensation to the user, thereby facilitating the user holding the gardening shears.

A further objective of the present invention is to provide a pair of gardening shears, wherein each of the two handles is exactly locked onto the main body by the locking member without incurring slip, thereby facilitating the user holding and operating the gardening shears.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
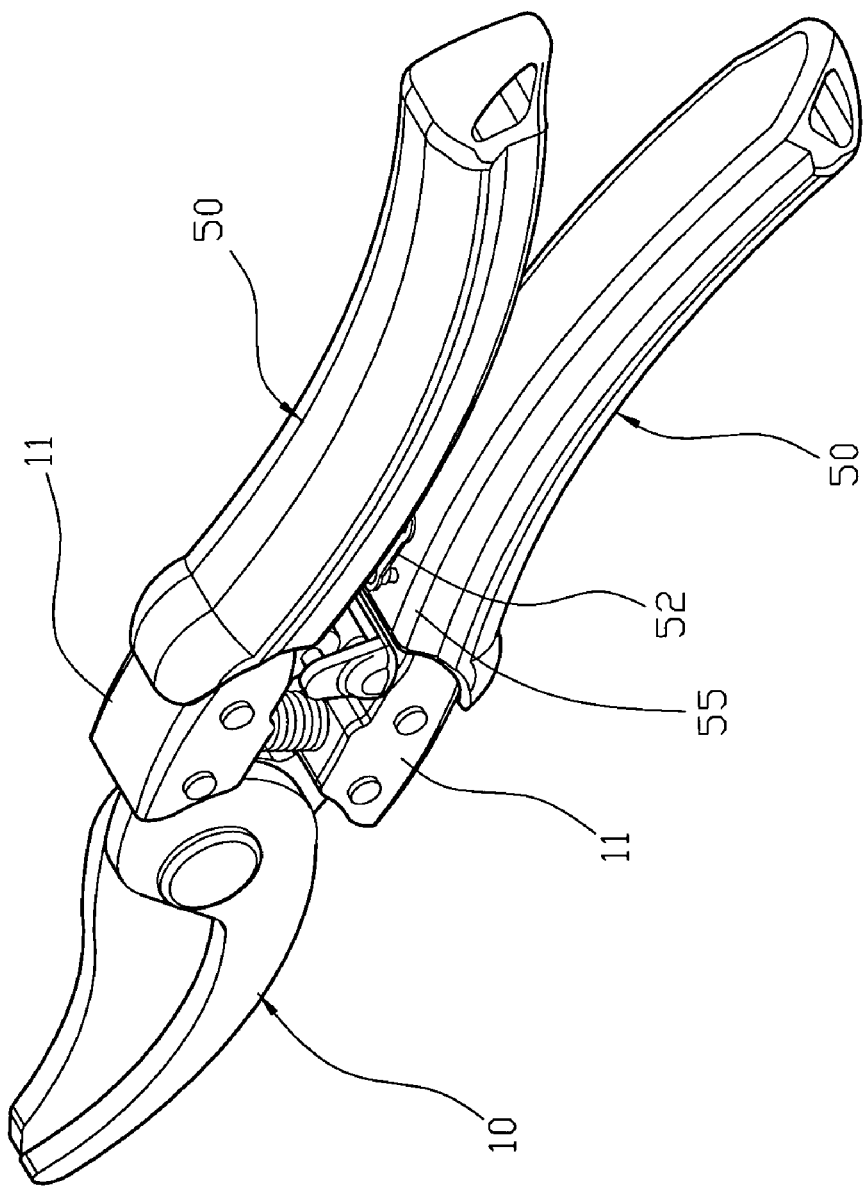
FIG. 1 is a perspective view of a pair of gardening shears in accordance with the preferred embodiment of the present invention.
Figure 2:
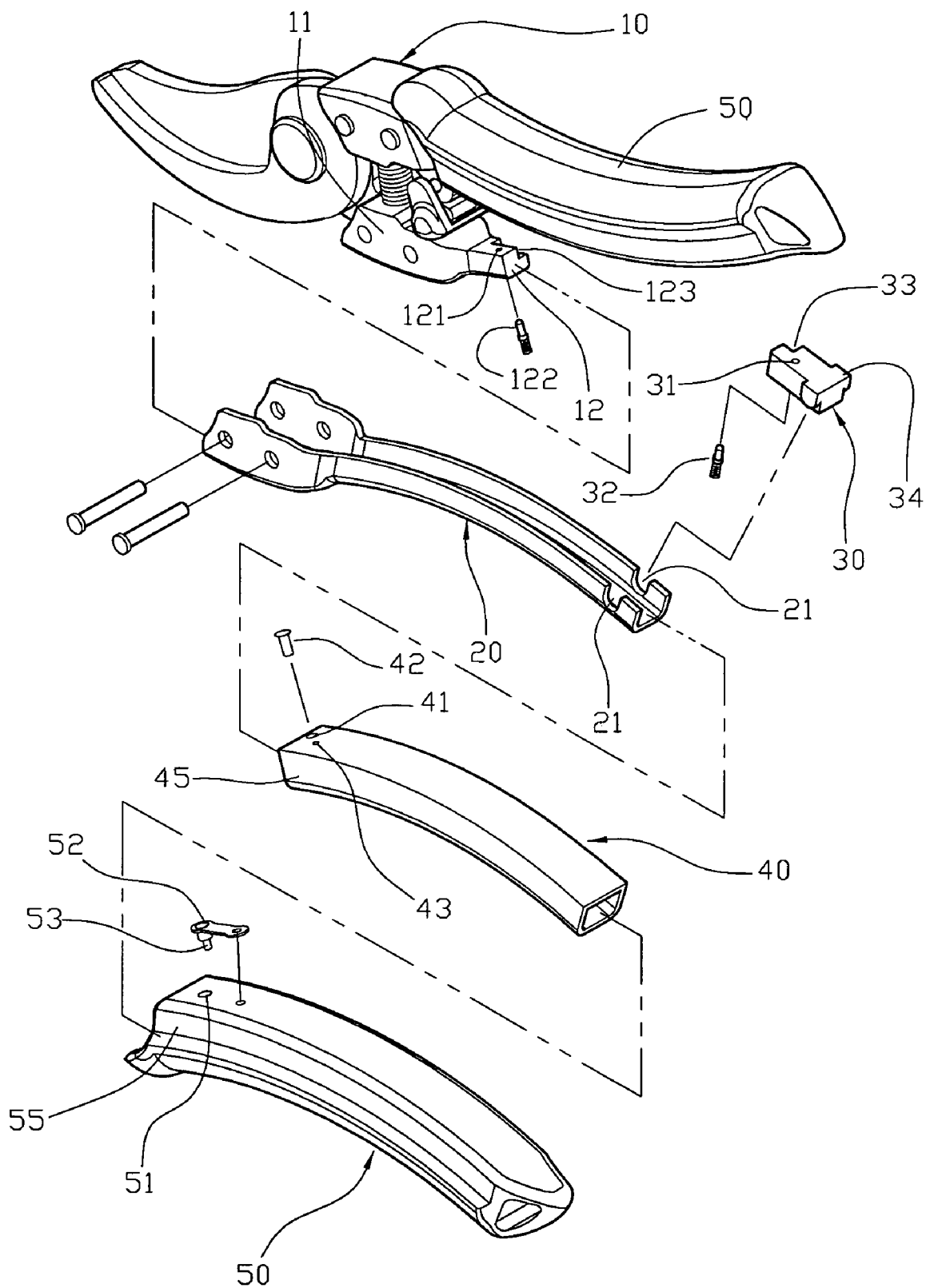
FIG. 2 is an exploded perspective view of the gardening shears as shown in FIG. 1.
Figure 3:
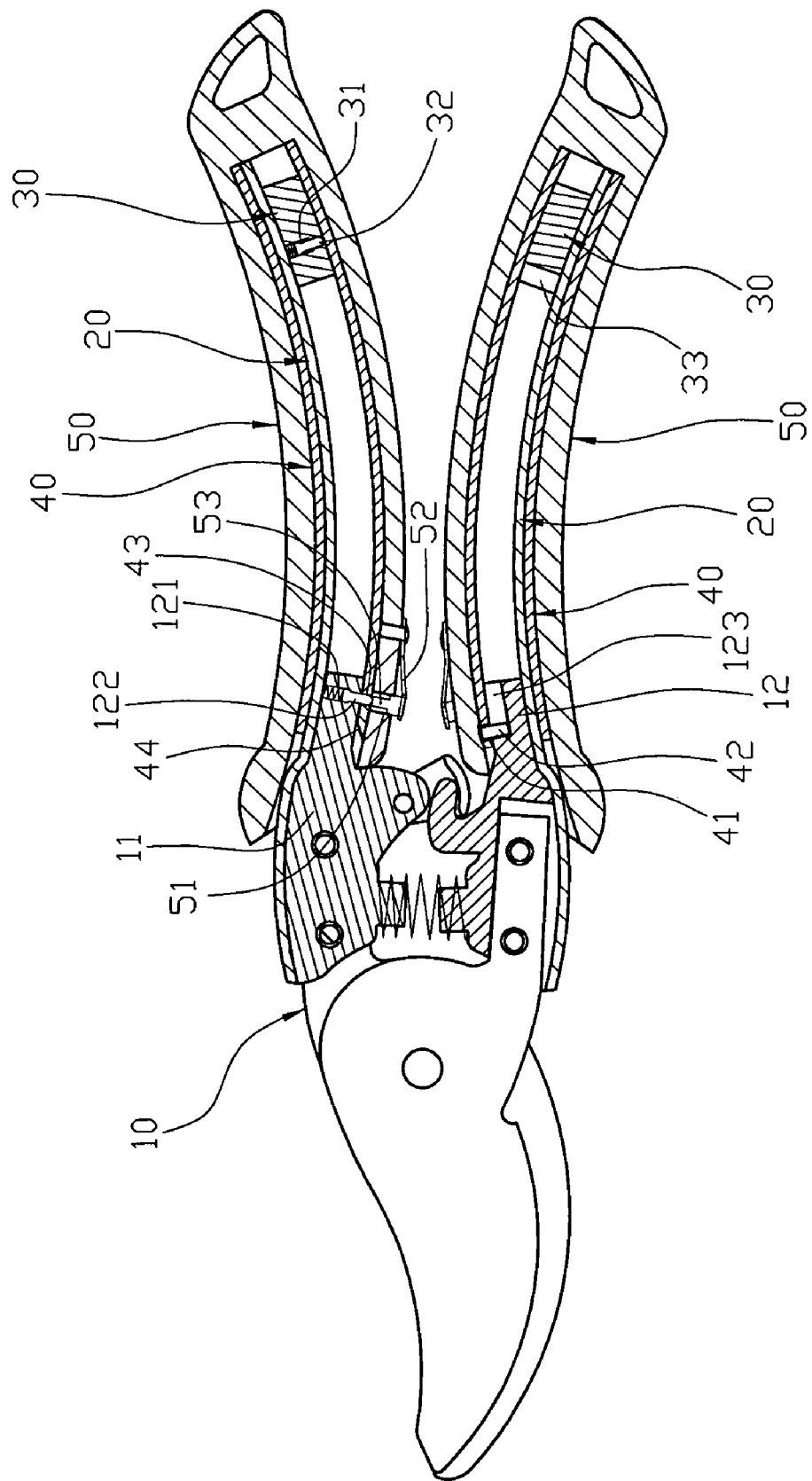
FIG. 3 is a plan cross-sectional view of the gardening shears as shown in FIG. 1.

Referring to the drawings and initially to FIGS. 1-3, a pair of gardening shears in accordance with the preferred embodiment of the present invention comprise a main body 10 having two connecting legs 11 pivotally connected with each other, two shanks 20 each having a first end mounted on the respective connecting leg 11 of the main body 10, two positioning blocks 30 each mounted on a second end of the respective shank 20, two handles 40 each movably mounted on the respective shank 20 and each having an end portion 45 movable between the respective connecting leg 11 of the main body 10 and the respective positioning block 30, and two handle jackets 50 each mounted on the respective handle 40 to move therewith.

Each of the connecting legs 11 of the main body 10 has a distal end formed with an extension 12 located in the respective shank 20 and having an inside formed with a mounting hole 121 for mounting a spring-biased locking member 122 which is biased between the respective shank 20 and the extension 12. The extension 12 of each of the connecting legs 11 of the main body 10 has a side formed with a stop groove 123.

Each of the two shanks 20 is substantially arc-shaped and is bent outwardly. Each of the two shanks 20 has a substantially U-shaped cross-sectional profile. The second end of each of the two shanks 20 has two side walls each formed with a locking recess 21.

Each of the two positioning blocks 30 has an inside formed with a mounting hole 31 for mounting a spring-biased locking member 32 which is biased between the respective shank 20 and the respective positioning block 30. Each of the two positioning blocks 30 has a side formed with a stop groove 33 and has an end having two sides each formed with a locking lug 34 locked in the locking recess 21 of the respective shank 20.

Each of the two handles 40 is substantially arc-shaped and is bent outwardly. Each of the two handles 40 has a substantially rectangular cross-sectional profile. The end portion 45 of each of the two handles 40 is formed with a locking hole 43 and provided with a limit pin 42 which is extended into an inside of the respective shank 20. The end portion 45 of each of the two handles 40 is formed with a limit hole 41 located beside the locking hole 43 for mounting the limit pin 42. The end portion 45 of each of the two handles 40 has an end face formed with an oblique guide face 44 (see FIG. 3) that is movable to press and retract the locking member 122 into the mounting hole 121 of the respective connecting leg 11 of the main body 10.

Figure 5:
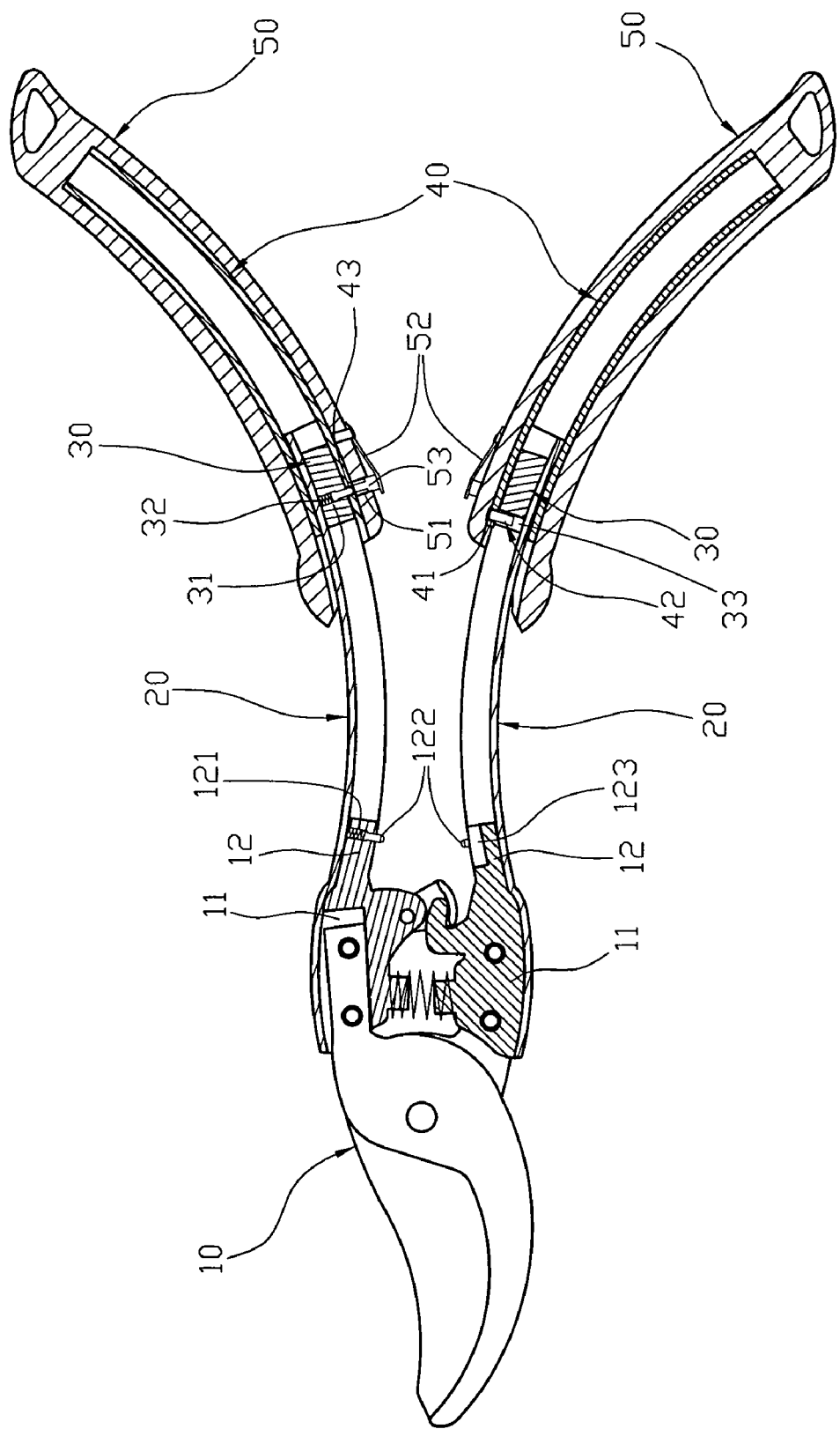
FIG. 5 is a schematic operational view of the gardening shears as shown in FIG. 4.

Thus, each of the two handles 40 is movable between a first position as shown in FIG. 3 where the locking hole 43 of each of the two handles 40 is aligned with the mounting hole 121 of the respective connecting leg 11 of the main body 10, so that the locking member 122 of each of the connecting legs 11 of the main body 10 is extended into and locked in the locking hole 43 of the respective handle 40, and a second position as shown in FIG. 5 where the locking hole 43 of each of the two handles 40 is aligned with the mounting hole 31 of the respective positioning block 30, so that the locking member 32 of each of the two positioning blocks 30 is extended into and locked in the locking hole 43 of the respective handle 40.

At this time, when each of the two handles 40 is movable to the first position as shown in FIG. 3, the limit pin 42 of each of the two handles 40 is stopped by the stop groove 123 of the respective connecting leg 11 of the main body 10, and when each of the two handles 40 is movable to the second position as shown in FIG. 5, the limit pin 42 of each of the two handles 40 is stopped by the stop groove 33 of the respective positioning block 30.

Each of the handle jackets 50 is substantially arc-shaped and is bent outwardly. Each of the handle jackets 50 has an end portion 55 formed with a through hole 51 aligning with the locking hole 43 of the respective handle 40 and provided with an elastic press knob 52 which has a push stub 53 movably mounted in the through hole 51 and aligning with the locking hole 43 of the respective handle 40.

Thus, when each of the two handles 40 is movable to the first position as shown in FIG. 3, the push stub 53 of the press knob 52 of each of the handle jackets 50 is movable to press and detach the locking member 122 of the respective connecting leg 11 of the main body 10 from the locking hole 43 of the respective handle 40, and when each of the two handles 40 is movable to the second position as shown in FIG. 5, the push stub 53 of the press knob 52 of each of the handle jackets 50 is movable to press and detach the locking member 32 of the respective positioning block 30 from the locking hole 43 of the respective handle 40.

As shown in FIG. 3, the locking hole 43 of each of the two handles 40 is aligned with the mounting hole 121 of the respective connecting leg 11 of the main body 10, so that the locking member 122 of each of the connecting legs 11 of the main body 10 is extended into and locked in the locking hole 43 of the respective handle 40, and each of the two handles 40 is locked onto the main body 10 by the locking member 122. At this time, the limit pin 42 of each of the two handles 40 is stopped by the stop groove 123 of the respective connecting leg 11 of the main body 10. Thus, each of the two handles 40 is retracted inwardly onto the main body 10.

Figure 4:
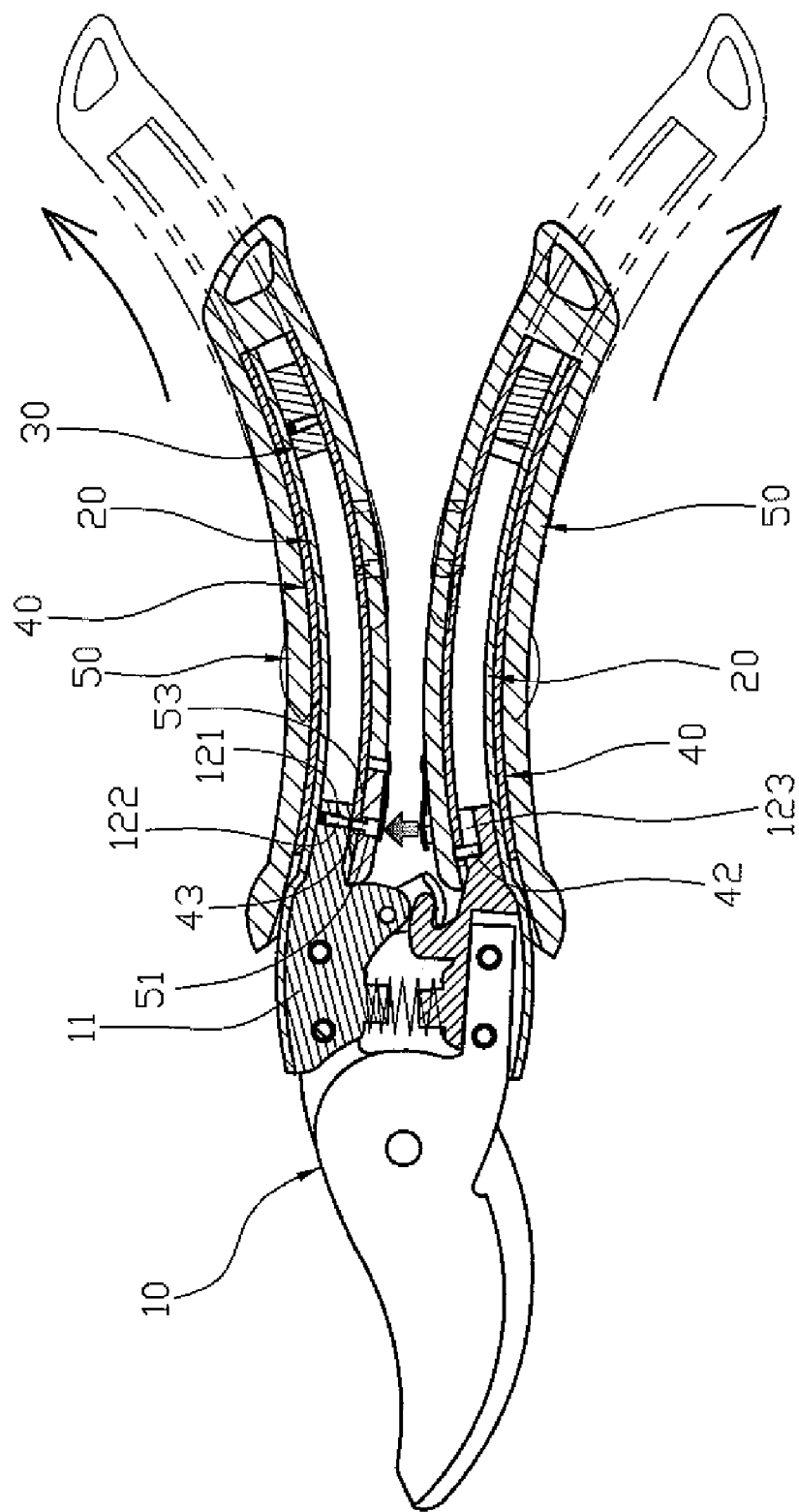
FIG. 4 is a schematic operational view of the gardening shears as shown in FIG. 3.

As shown in FIG. 4, when the press knob 52 of each of the handle jackets 50 is pressed, the push stub 53 of the press knob 52 of each of the handle jackets 50 is movable to press and detach the locking member 122 of the respective connecting leg 11 of the main body 10 from the locking hole 43 of the respective handle 40, thereby releasing each of the two handles 40 from the main body 10, so that each of the two handles 40 is movable outwardly on the respective shank 20 to increase the distance between the main body 10 and each of the two handles 40.

As shown in FIG. 5, the locking hole 43 of each of the two handles 40 is aligned with the mounting hole 31 of the respective positioning block 30, so that the locking member 32 of each of the two positioning blocks 30 is extended into and locked in the locking hole 43 of the respective handle 40, and each of the two handles 40 is locked onto the main body 10 by the locking member 32. At this time, the limit pin 42 of each of the two handles 40 is stopped by the stop groove 33 of the respective positioning block 30. Thus, each of the two handles 40 is fully expanded outwardly from the main body 10.

Accordingly, each of the two handles 40 is retracted inwardly onto and fully expanded outwardly from the main body 10 to adjust the distance between the main body 10 and each of the two handles 40, thereby facilitating the user operating the gardening shears in an energy-saving manner. In addition, each of the two handles 40 is substantially arc-shaped and is bent outwardly to provide a comfortable sensation to the user, thereby facilitating the user holding the gardening shears. Further, each of the two handles 40 is exactly locked onto the main body 10 by the locking member 122 and 32 without incurring slip, thereby facilitating the user holding and operating the gardening shears.

Figure 6:
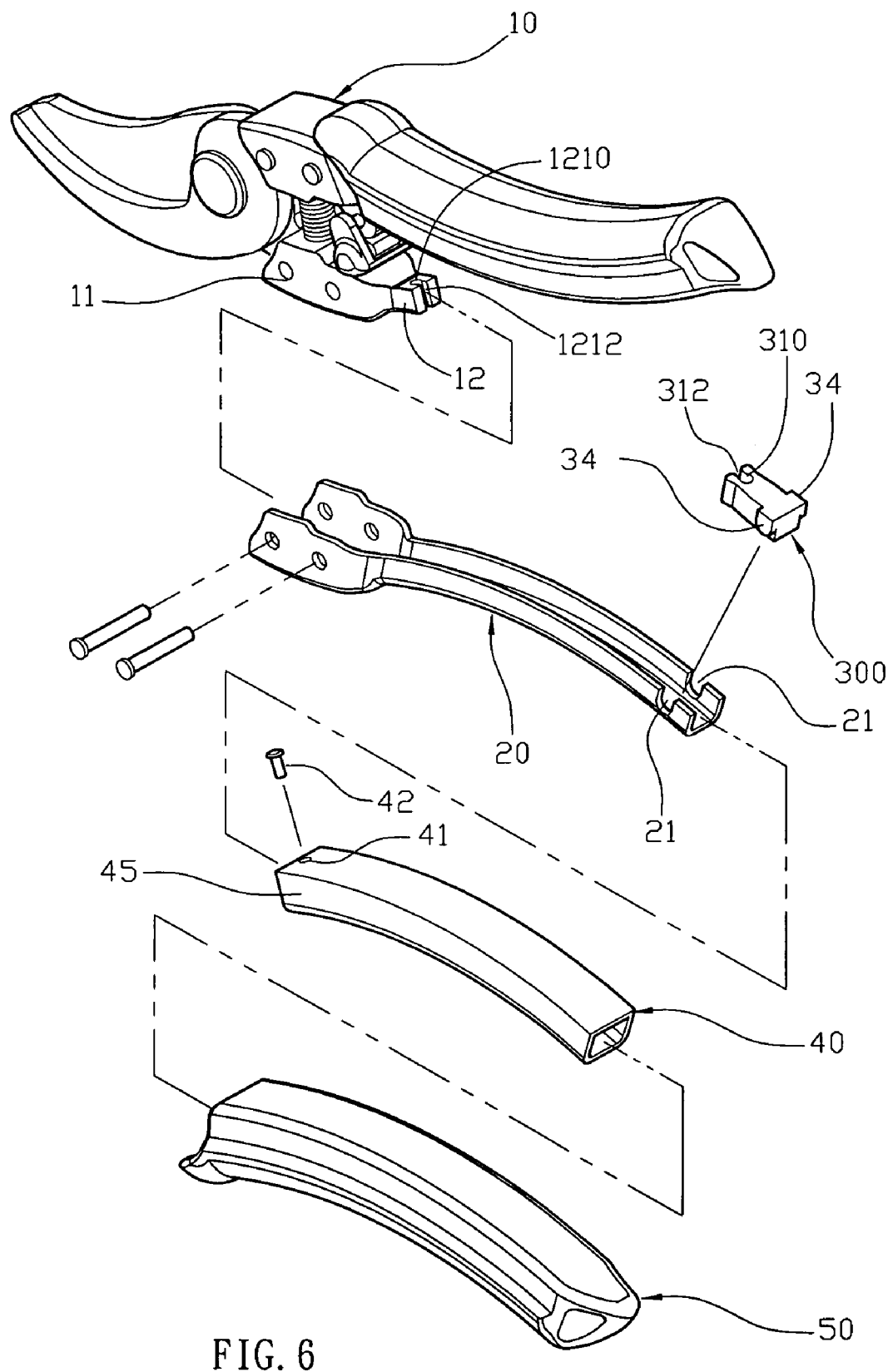
FIG. 6 is an exploded perspective view of a pair of gardening shears in accordance with another preferred embodiment of the present invention.
Figure 7:
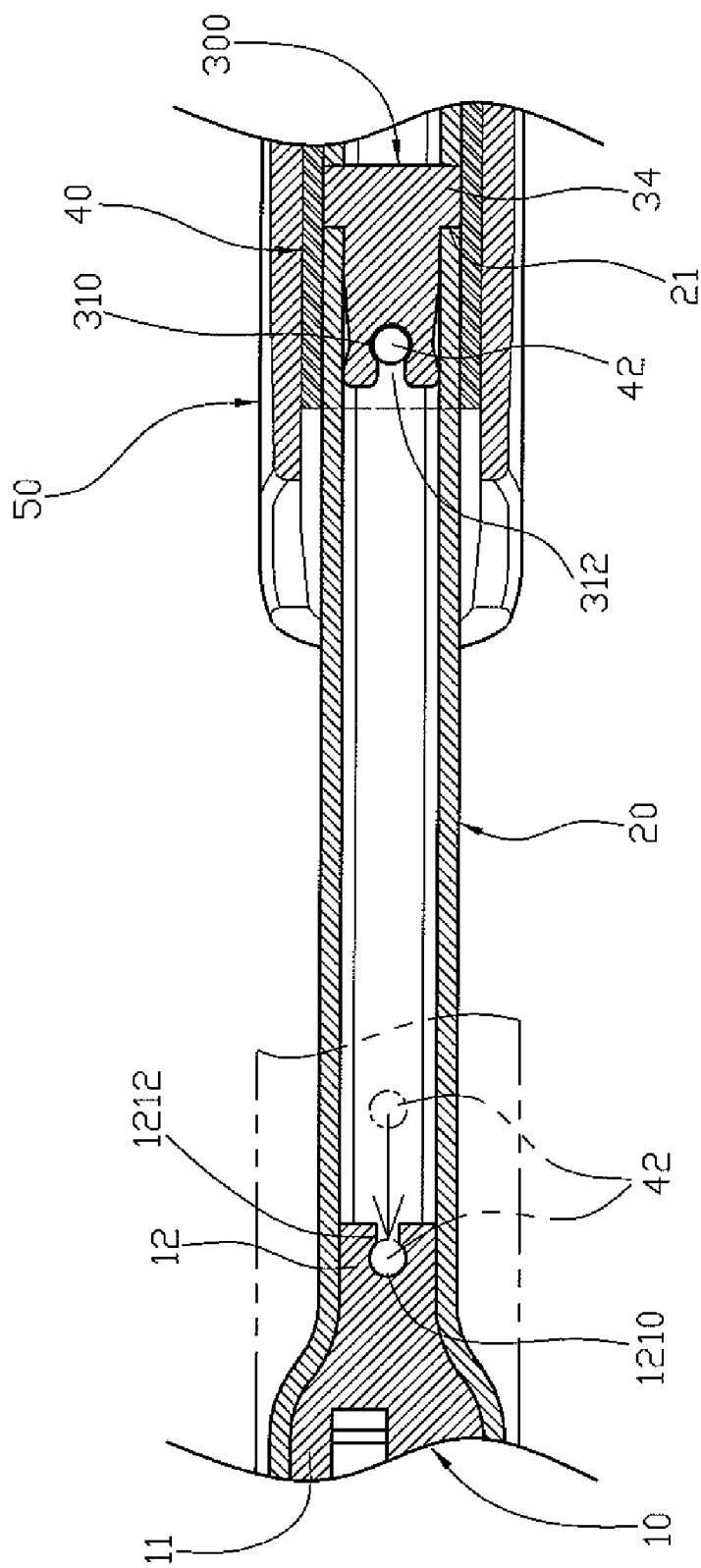
FIG. 7 is a plan cross-sectional assembly operational view of the gardening shears as shown in FIG. 6.

Referring to FIGS. 6 and 7, each of the connecting legs 11 of the main body 10 has a distal end formed with an extension 12 located in the respective shank 20 and having an inside formed with a mounting hole 1210 having an opening 1212 facing the respective positioning block 300. Each of the two positioning blocks 300 has an inside formed with a mounting hole 310 having an opening 312 facing the respective connecting leg 11 of the main body 10. The end portion 45 of each of the two handles 40 is provided with a limit pin 42 which is extended into an inside of the respective shank 20. The end portion 45 of each of the two handles 40 is formed with a limit hole 41 for mounting the limit pin 42.

Thus, each of the two handles 40 is movable between a first position where the limit pin 42 of each of the two handles 40 is inserted into and locked in the mounting hole 1210 of the respective connecting leg 11 of the main body 10 so that each of the two handles 40 is retracted inwardly onto the main body 10, and a second position where the limit pin 42 of each of the two handles 40 is inserted into and locked in the mounting hole 310 of the respective positioning block 300 so that each of the two handles 40 is fully expanded outwardly from the main body 10.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A pair of gardening shears, comprising:
   a main body having two connecting legs pivotally connected with each other;
   two shanks each having a first end mounted on the respective connecting leg of the main body;
   two positioning blocks each mounted on a second end of the respective shank;
   two handles each movably mounted on the respective shank and each having an end portion movable between the respective connecting leg of the main body and the respective positioning block;
   two handle jackets each mounted on the respective handle to move therewith; wherein:
   each of the connecting legs of the main body has a distal end formed with an extension located in the respective shank and having an inside formed with a mounting hole for mounting a spring-biased locking member which is biased between the respective shank and the extension;
   each of the two positioning blocks has an inside formed with a mounting hole for mounting a spring-biased locking member which is biased between the respective shank and the respective positioning block;
   the end portion of each of the two handles is formed with a locking hole.

2. The gardening shears in accordance with claim 1, wherein each of the two handles is movable between a first position where the locking hole of each of the two handles is aligned with the mounting hole of the respective connecting leg of the main body, so that the locking member of each of the connecting legs of the main body is extended into and locked in the locking hole of the respective handle, and a second position where the locking hole of each of the two handles is aligned with the mounting hole of the respective positioning block, so that the locking member of each of the two positioning blocks is extended into and locked in the locking hole of the respective handle.

3. The gardening shears in accordance with claim 2, wherein:
the extension of each of the connecting legs of the main body has a side formed with a stop groove;
each of the two positioning blocks has a side formed with a stop groove;
the end portion of each of the two handles is provided with a limit pin which is extended into an inside of the respective shank.

4. The gardening shears in accordance with claim 3, wherein when each of the two handles is movable to the first position, the limit pin of each of the two handles is stopped by the stop groove of the respective connecting leg of the main body, and when each of the two handles is movable to the second position, the limit pin of each of the two handles is stopped by the stop groove of the respective positioning block.

5. The gardening shears in accordance with claim 3, wherein the end portion of each of the two handles is formed with a limit hole located beside the locking hole for mounting the limit pin.

6. The gardening shears in accordance with claim 2, wherein each of the handle jackets has an end portion formed with a through hole aligning with the locking hole of the respective handle and provided with an elastic press knob which has a push stub movably mounted in the through hole and aligning with the locking hole of the respective handle.

7. The gardening shears in accordance with claim 6, wherein when each of the two handles is movable to the first position, the push stub of the press knob of each of the handle jackets is movable to press and detach the locking member of the respective connecting leg of the main body from the locking hole of the respective handle, and when each of the two handles is movable to the second position, the push stub of the press knob of each of the handle jackets is movable to press and detach the locking member of the respective positioning block from the locking hole of the respective handle.

8. The gardening shears in accordance with claim 1, wherein each of the two shanks is substantially arc-shaped and is bent outwardly.

9. The gardening shears in accordance with claim 1, wherein each of the two shanks has a substantially U-shaped cross-sectional profile.

10. The gardening shears in accordance with claim 1, wherein each of the two handles is substantially arc-shaped and is bent outwardly.

11. The gardening shears in accordance with claim 1, wherein each of the two handles has a substantially rectangular cross-sectional profile.

12. The gardening shears in accordance with claim 1, wherein the end portion of each of the two handles has an end face formed with an oblique guide face that is movable to press and retract the locking member of the respective connecting leg into the mounting hole of the respective connecting leg of the main body.

13. The gardening shears in accordance with claim 1, wherein each of the handle jackets is substantially arc-shaped and is bent outwardly.

14. A pair of gardening shears, comprising:
a main body having two connecting legs pivotally connected with each other;
two shanks each having a first end mounted on the respective connecting leg of the main body;
two positioning blocks each mounted on a second end of the respective shank;
two handles each movably mounted on the respective shank and each having an end portion movable between the respective connecting leg of the main body and the respective positioning block;
two handle jackets each mounted on the respective handle to move therewith;
wherein the second end of each of the two shanks has two side walls each formed with a locking recess, and each of the two positioning blocks has an end having two sides each formed with a locking lug locked in the locking recess of the respective shank.

* * * * *